US012304093B2

(12) United States Patent
Matthews

(10) Patent No.: US 12,304,093 B2
(45) Date of Patent: May 20, 2025

(54) HAIR-CUTTING APPARATUS

(71) Applicant: Malachi E. Matthews, Palos Hills, IL (US)

(72) Inventor: Malachi E. Matthews, Palos Hills, IL (US)

( * ) Notice: Subject to any disclaimer, the term of this patent is extended or adjusted under 35 U.S.C. 154(b) by 292 days.

(21) Appl. No.: 18/150,948

(22) Filed: Jan. 6, 2023

(65) Prior Publication Data

US 2024/0227218 A1 Jul. 11, 2024

(51) Int. Cl.
*B26B 13/06* (2006.01)
*B26B 13/08* (2006.01)

(52) U.S. Cl.
CPC .............. *B26B 13/06* (2013.01); *B26B 13/08* (2013.01)

(58) Field of Classification Search
CPC ......... B26B 13/00; B26B 13/06; B26B 13/08; B26B 13/10; B26B 13/12; B26B 17/00; B26B 17/003; B26B 17/006; A01G 3/02
USPC .......... D8/57
See application file for complete search history.

(56) References Cited

U.S. PATENT DOCUMENTS 555,108 A * 2/1896 Morrill ................. B26B 17/003 30/183
D123,079 S * 10/1940 De Requesens ................. D8/57
D134,395 S * 11/1942 Bain ................. D8/57
2,596,382 A * 5/1952 Duke ................. A47J 43/26 30/120.3
3,461,555 A * 8/1969 Bliznak ................. B23D 29/023 30/254
D215,904 S * 11/1969 Foerster ................. D8/57
D233,803 S * 11/1974 Cummings ................. D8/57
3,922,783 A * 12/1975 Hayes ................. B26B 13/26 30/250
4,709,480 A * 12/1987 Takigawa ................. B26B 13/06 30/345
4,815,210 A * 3/1989 Burrage ................. B26B 13/06 30/176
5,379,521 A * 1/1995 Lynders ................. B26B 13/00 30/233

(Continued)

FOREIGN PATENT DOCUMENTS

DE 29510632 U1 * 10/1995 ............. B26B 13/06
DE 29705219 U1 * 5/1997 ............. B26B 13/06

(Continued)

*Primary Examiner* — Jason Daniel Prone
(74) *Attorney, Agent, or Firm* — Nixon Peabody LLP

(57) ABSTRACT

A hair-cutting apparatus includes a first scissor and a second scissor. The first scissor includes a first jaw, a first curved blade, and a first handle. The first jaw includes a concave inner surface from which the first curved blade projects. The second scissor includes a second jaw, a second curved blade, and a second handle. The second jaw includes a concave inner surface from which the second curved blade projects. The first and second scissors are pivotably connected to each other. The first curved blade and the second curved blade form an opening when in the closed position that is of a generally elongated ellipse shape. The first and second jaws define a generally horizontal plane. The first curved blade projects in a generally downwardly and inwardly direction from the generally horizontal plane at a first angle. The second curved blade projects similarly at a second angle.

8 Claims, 5 Drawing Sheets

(56) References Cited

U.S. PATENT DOCUMENTS

| | | | | | |
|---|---|---|---|---|---|
| 5,749,147 | A * | 5/1998 | Hasegawa | B26B 13/06 30/254 |
| 6,061,912 | A | 5/2000 | Gazaway | |
| 6,247,236 | B1 * | 6/2001 | Johnson | B26B 13/06 30/140 |
| 6,305,086 | B1 * | 10/2001 | Burgholzer | B26B 17/00 30/186 |
| 6,313,439 | B1 * | 11/2001 | Fischbach | B26B 17/00 132/224 |
| 6,637,116 | B1 * | 10/2003 | Hill | B26B 13/00 30/253 |
| 6,751,870 | B2 * | 6/2004 | Tapia | B26B 17/00 30/259 |
| D505,607 | S * | 5/2005 | McMinn | D8/57 |
| D624,797 | S * | 10/2010 | Kochi | D8/52 |
| D646,946 | S * | 10/2011 | Bhasin | D8/57 |
| D654,339 | S * | 2/2012 | Lewis | D8/57 |
| 9,084,626 | B1 * | 7/2015 | Asfora | A61B 18/1442 |
| 9,198,493 | B2 * | 12/2015 | Hall | B26B 21/4081 |
| 9,597,811 | B2 | 3/2017 | Talavera | |
| 10,875,200 | B2 * | 12/2020 | Rolling | B26B 21/4031 |
| 11,161,264 | B2 | 11/2021 | Rolling | |
| 11,849,734 | B1 * | 12/2023 | Davidson | B26B 13/08 |
| 2007/0163126 | A1 | 7/2007 | Huang | |
| 2007/0289142 | A1 * | 12/2007 | Hsieh | B26B 13/06 30/173 |
| 2008/0271324 | A1 * | 11/2008 | Fryer | B26B 17/006 30/175 |
| 2011/0289784 | A1 * | 12/2011 | Jones | B26B 17/00 30/175 |
| 2013/0260658 | A1 * | 10/2013 | Brooks | A22C 29/027 452/6 |
| 2013/0327348 | A1 * | 12/2013 | Ashur | B26B 13/06 30/27 |
| 2015/0128427 | A1 * | 5/2015 | Linn | B26B 13/06 30/260 |
| 2017/0055458 | A1 * | 3/2017 | Helmsderfer | A01G 3/02 |
| 2019/0008122 | A1 * | 1/2019 | Zhu | B26B 13/08 |
| 2019/0299431 | A1 * | 10/2019 | Montgomery | B26B 17/00 |
| 2019/0364868 | A1 * | 12/2019 | Garner | B26B 17/00 |
| 2022/0395992 | A1 * | 12/2022 | Hughes | B26B 17/006 |
| 2024/0335961 | A1 * | 10/2024 | Pritchett | B26B 13/06 |

FOREIGN PATENT DOCUMENTS

| | | | | |
|---|---|---|---|---|
| EP | 3529017 | B1 | 2/2021 | |
| GB | 180875 | A * | 6/1922 | B26B 13/06 |
| GB | 243138 | A * | 11/1925 | B26B 13/06 |
| JP | 2017051116 | A * | 3/2017 | B26B 13/06 |
| KR | 200428930 | Y1 * | 10/2006 | B26B 13/06 |
| KR | 20110003098 | U * | 3/2011 | B26B 13/06 |
| KR | 20120004439 | U * | 6/2012 | B26B 13/08 |
| KR | 200470772 | Y1 * | 1/2014 | B26B 13/06 |
| KR | 101425102 | B1 * | 8/2014 | B26B 13/06 |
| WO | WO-2008048063 | A1 * | 4/2008 | B26B 13/06 |

* cited by examiner

HAIR-CUTTING APPARATUS

TECHNICAL FIELD

This disclosure generally relates to hair-cutting apparatuses and methods of using the same. More specifically, the disclosure is directed to hair-cutting apparatuses for trimming loose hair fibers from braids.

BACKGROUND

Braids and braiding refer to a hair style and process in which three or more bundles of hair are crossed over each other to form a braid. A common issue with braided hairstyles is the presence of loose hair strands that protrude from the braids and give the braids an unkempt look.

A current method of trimming loose hair strands that protrude from braids includes burning the protruding portions of the hair strands, which is both time-consuming and may be a dangerous process. Another current method of trimming loose hair strands includes trimming each individual strand with a pair of scissors, which is tedious and time consuming since each side of each braid must be analyzed and trimmed. Thus, there is a need for a hair-cutting apparatus and a method of using the same that address this problem in a more efficient and safer manner.

SUMMARY

In one embodiment, a hair-cutting apparatus includes a first scissor and a second scissor. The first scissor includes a first jaw, a first curved blade, and a first handle. The first jaw includes a concave inner surface from which the first curved blade projects. The second scissor includes a second jaw, a second curved blade, and a second handle. The second jaw includes a concave inner surface from which the second curved blade projects. The first and second scissors are pivotably connected to each other and are configured to move between open and closed positions. The first curved blade and the second curved blade form an opening when in the closed position. The opening is of a generally elongated ellipse shape and is configured to receive and correspond with braided hair. The first and second jaws define a generally horizontal plane. The first curved blade projects in a generally downwardly and inwardly direction from the generally horizontal plane at a first angle. The second curved blade projects in a generally downwardly and inwardly direction from the generally horizontal plane at a second angle. The first and second angles are from about 10 degrees and to about 70 degrees.

In another embodiment, a method of trimming hair fibers from braided hair includes providing a hair-cutting apparatus. The hair-cutting apparatus includes a first scissor and a second scissor. The first scissor includes a first jaw, a first curved blade, and a first handle. The first jaw includes a concave inner surface from which the first curved blade projects. The second scissor includes a second jaw, a second curved blade, and a second handle. The second jaw includes a concave inner surface from which the second curved blade projects. The first and second scissors are pivotably connected to each other and are configured to move between open and closed positions. The first curved blade and the second curved blade form an opening in the closed position. The opening is of a generally elongated ellipse shape and is configured to receive and correspond with braided hair. The first and second jaws define a generally horizontal plane. The first curved blade projects in a generally downwardly and inwardly direction from the generally horizontal plane at a first angle. The second curved blade projects in a generally downwardly and inwardly direction from the generally horizontal plane at a second angle. The first and second angles are from about 10 degrees and to about 70 degrees. The method further comprises providing the braided hair and positioning the hair-cutting apparatus around a length of the braided hair. The length of the braided hair extends from a first end to a second end and the length of the braided hair extends through the opening. The method further comprises moving the hair-cutting apparatus from the first end to the second end of the braided hair so as to trim at least one of the hair fibers extending outwardly from the braided hair.

In another embodiment, a hair-cutting apparatus includes a first scissor and a second scissor. The first scissor includes a first jaw, a first curved blade, and a first handle. The first jaw includes a concave inner surface from which the first curved blade projects generally perpendicularly. The first curved blade has a first slanted portion located farther from the first jaw. The second scissor includes a second jaw, a second curved blade, and a second handle. The second jaw includes a concave inner surface from which the second curved blade projects generally perpendicularly. The second curved blade has a second slanted portion located farther from the second jaw. The first and second scissors are pivotably connected to each other and are configured to move between open and closed positions. The first curved blade and the second curved blade form an opening in the closed position. The opening is of a generally elongated ellipse shape and is configured to receive and correspond with braided hair. The first and second jaws define a generally horizontal plane. The first slanted portion projects in a generally downwardly and inwardly direction from the generally horizontal plane at a first angle. The second slanted portion projects in a generally downwardly and inwardly direction from the generally horizontal plane at a second angle. The first and second angles are from about 10 degrees and to about 70 degrees.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

Disclosed herein are embodiments of apparatuses, and methods pertaining to an apparatus for trimming loose hair strands from braids. This description includes drawings, wherein.

Figure 1:
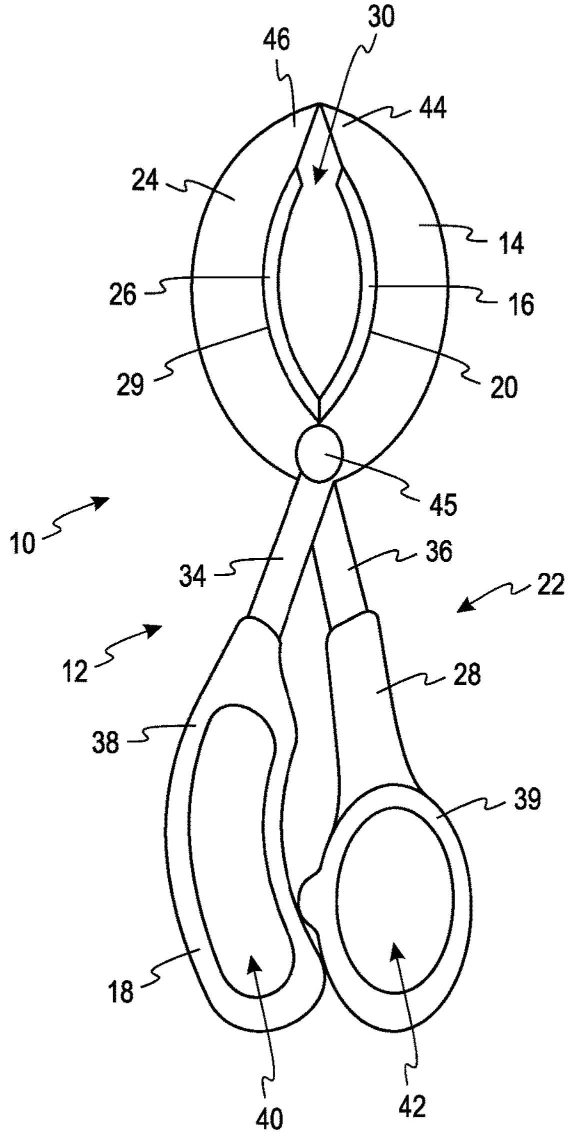
FIG. 1 is a top view of a hair-cutting apparatus in a closed position according to an embodiment.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present invention is described with reference to the attached figures, wherein like reference numerals are used throughout the figures to designate similar or equivalent elements. The figures are not drawn to scale, and they are provided merely to illustrate the instant invention. Several aspects of the invention are described below with reference to example applications for illustration. While the foregoing written description of the invention enables one of ordinary skill to make and use what is considered presently to be the best mode thereof, those of ordinary skill will understand and appreciate the existence of variations, combinations, and equivalents of the specific embodiments, methods, and examples herein. The invention should therefore not be limited by the above-described embodiments, methods, and examples, but by all embodiments and methods within the scope and spirit of the invention.

Figure 2:
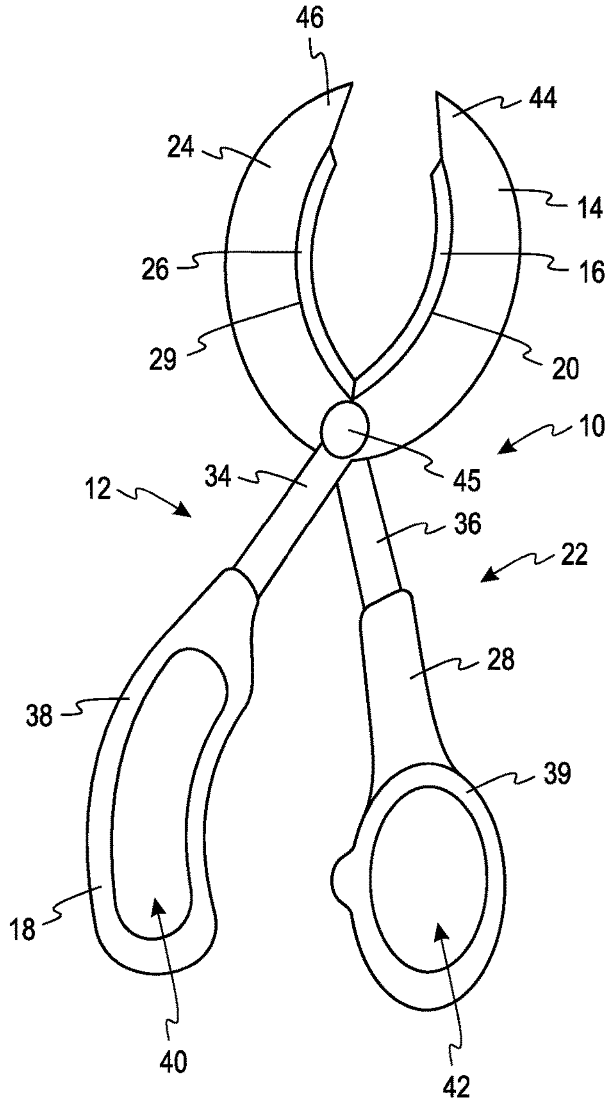
FIG. 2 is a top view of the hair-cutting apparatus of FIG. 1 in an open position.

Referring to FIGS. 1-3B, a hair-cutting apparatus 10 is shown according to one embodiment. FIG. 1 shows the hair-cutting apparatus 10 in a closed position, while FIG. 2 shows the hair-cutting apparatus 10 in an open position. The hair-cutting apparatus 10 includes a first scissor 12 that is pivotably connected to a second scissor 22. The first scissor 12 includes a first jaw 14 that has a first curved blade 16 protruding from a concave inner surface 20 of the first jaw 14. The first scissor 12 further includes a first handle 18 that is connected to the first jaw 14.

The second scissor 22 includes a second jaw 24 with a concave inner surface 29 from which a second curved blade 26 protrudes. The second scissor 22 further includes a second handle 28 connected to the second jaw 24. As shown best in FIGS. 1 and 2, the first scissor 12 and the second scissor 22 are pivotably connected at a connection point 45 between their respective handles 18, 28 and jaws 14, 24 to facilitate the hair-cutting apparatus 10 in moving or pivoting between opened and closed positions.

Referring back to FIG. 1, the first curved blade 16 and the second curved blade 26 form an opening 30 when the hair-cutting apparatus 10 is in the closed position. The opening 30 is of a generally elongated ellipse shape and is configured to receive and correspond with, for example, braided hair as will be discussed below. The opening 30 is sized and configured such that only loose ends are cut by the hair-cutting apparatus 10, and not the braid itself.

In one embodiment, at least one of the first jaw 14 and the second jaw 24 is in a general shape of an arc. This general shape of an arc may form the concave inner surface 20 from which the first curved blade 16 protrudes from the first jaw 14. Similarly, the general shape of an arc may form the concave inner surface 29 from which the second curved blade 26 protrudes from the second jaw 24.

In one embodiment, the hair-cutting apparatus 10 further includes a first shank 34 and a second shank 36. As shown best in FIGS. 1 and 2, the first shank 34 connects the first handle 18 to the first jaw 14. Similarly, the second shank 36 connects the second handle 28 to the second jaw 24.

In one embodiment, the first handle 18 and the second handle 28 further include a respective rubber coating 38, 39. As can be seen in FIGS. 1-2, the rubber coatings 38, 39 on the respective handles 18, 28 assist in improving the ergonomics of the first and second handles 18, 28. Non-limiting examples of material that may form the rubber coatings 38, 39 include natural and synthetic rubbers such as isoprene, styrene-butadiene rubber, silicone, and/or polyurethane. It is contemplated that the rubber coatings may be formed of other materials. The rubber coatings 38, 39 are typically the same on the first and second handles, but it is contemplated that the rubber coatings 38, 39 may be different.

As shown best in FIGS. 1 and 2, the hair-cutting apparatus 10 further includes a first opening 40 formed and defined by the first handle 18, and a second opening 42 formed and defined by the second handle 28. The first opening 40 and the second opening 42 are desirably sized and shaped to allow one or more fingers of a user to extend therethrough. In one embodiment, the first opening 40 is larger than the second opening 42. In some embodiments, the first opening 40 is configured to enclose one, two, three, or four fingers of a user, while the second opening 42 is configured to enclose a thumb of a user. In some embodiments, the first opening 40 is larger than the second opening 42.

In some embodiments, the hair-cutting apparatus 10 further includes a first jaw tip 44, which is located on the first jaw 14 farther from the first handle 18, and a second jaw tip 46, which is located on the second jaw 24 farther from the second handle 28. In one embodiment, and as shown in FIG. 1, the first jaw tip 44 and the second jaw tip 46 are configured to contact each other when the hair-cutting apparatus 10 is in the closed position.

Figure 3A:
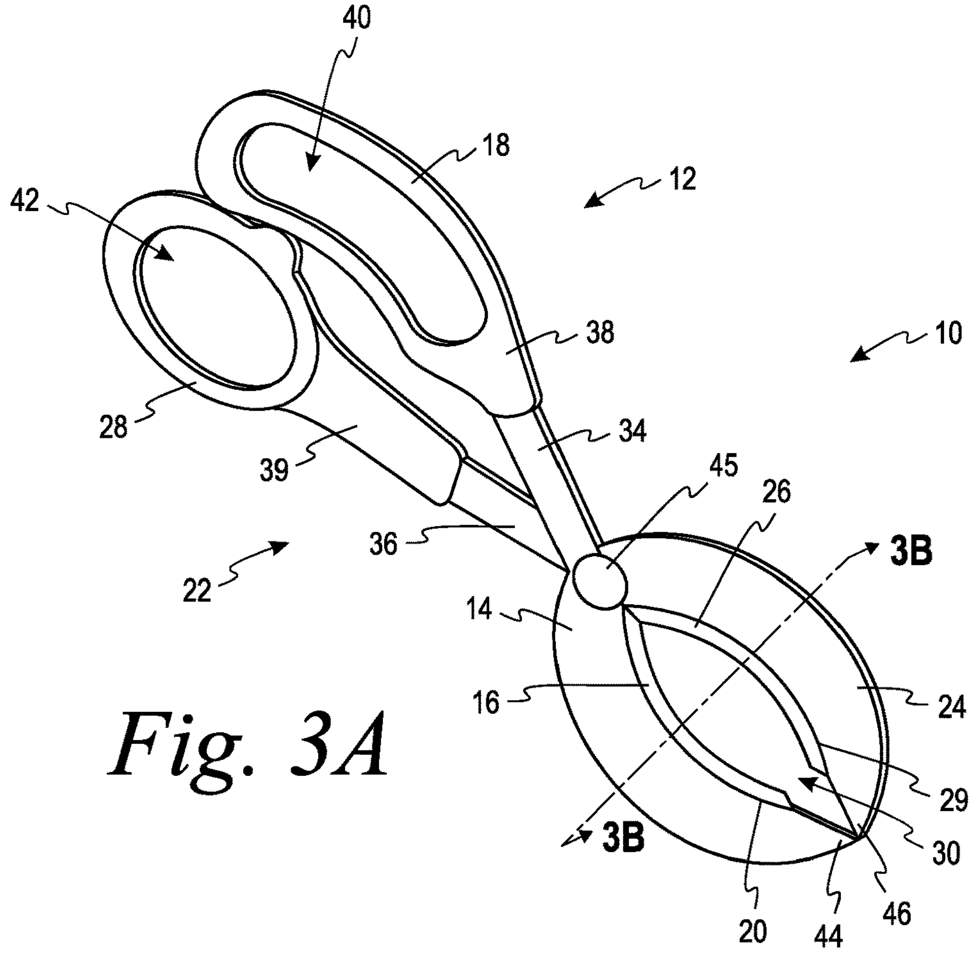
FIG. 3A is a perspective view of the hair-cutting apparatus of FIGS. 1 and 2.
Figure 3B:
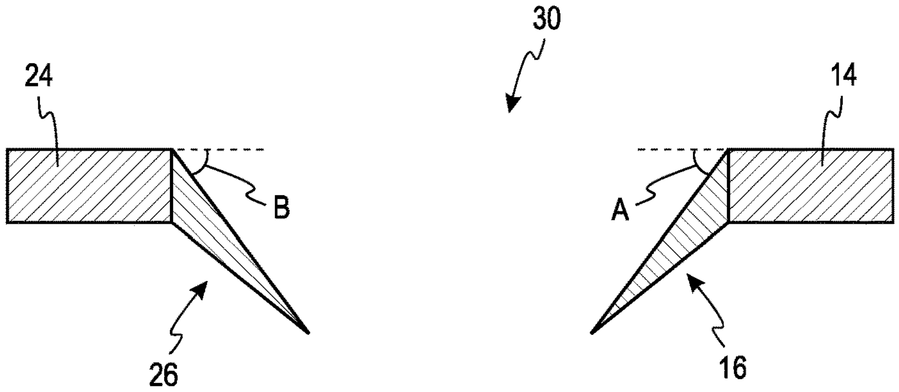
FIG. 3B is an enlarged cross section of the hair-cutting apparatus along a line 3B-3B of FIG. 3A.

Referring to FIG. 3A, a perspective view of the hair-cutting apparatus 10 is shown with a generally cross sectional line 3B-3B that is shown in FIG. 3B. The cross-sectional view of FIG. 3B is a view from the handles 18, 28 looking downwardly.

As shown in FIG. 3A, the first jaw 14 and the second jaw 24 define a generally horizontal plane. In this embodiment, for example, the concave inner surface 20 of the first jaw 14 and the concave inner surface 29 of the second jaw 24 are facing each other. As shown best in FIG. 3B, the first curved blade 16 projects from the concave inner surface 20 of the first jaw 14 in a direction deviating from the generally horizontal plane at a first angle A. Similarly, the second curved blade 26 projects from the concave inner surface 29 of the second jaw 24 in a direction deviating from the generally horizontal plane at a second angle B. In this embodiment, the first curved blade 16 and the second curved blade 26 both project downwardly from the generally horizontal plane and inwardly.

As shown best in FIG. 3B, the first angle A and the second angle B may be between from about 10 degrees to about 80 degrees. In a further embodiment, the first angle A and the second angle B are from about 20 degrees to about 70 degrees. In another embodiment, the first angle A and the second angle B are from about 30 degrees to about 60 degrees. It is contemplated that the first angle A is about the same as the second angle B in one embodiment.

Figure 4:
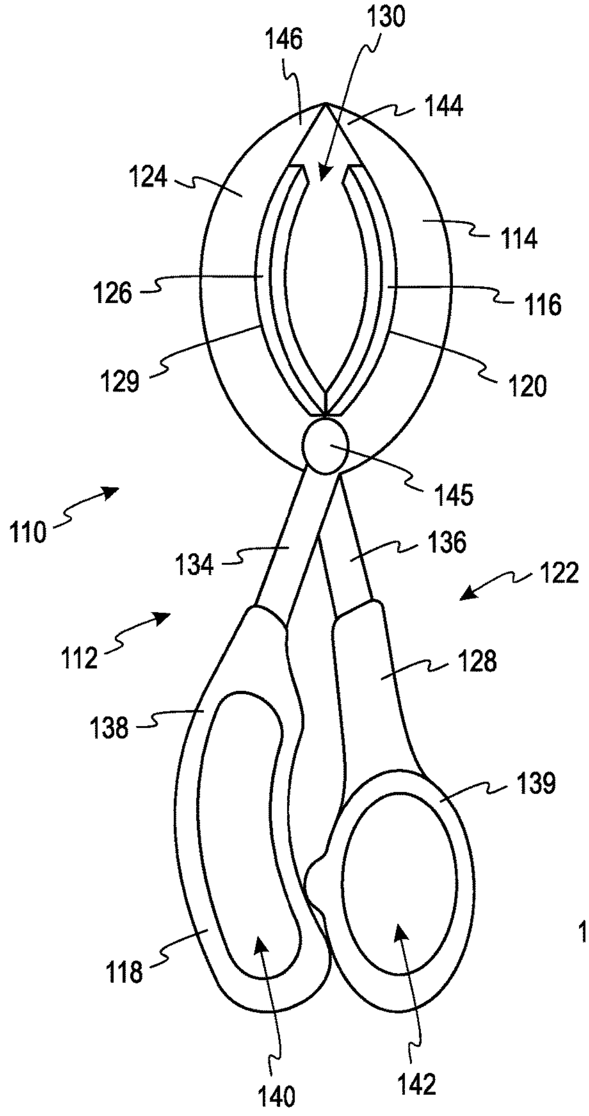
FIG. 4 is a top view of a hair-cutting apparatus in a closed position according to another embodiment.
Figure 5:
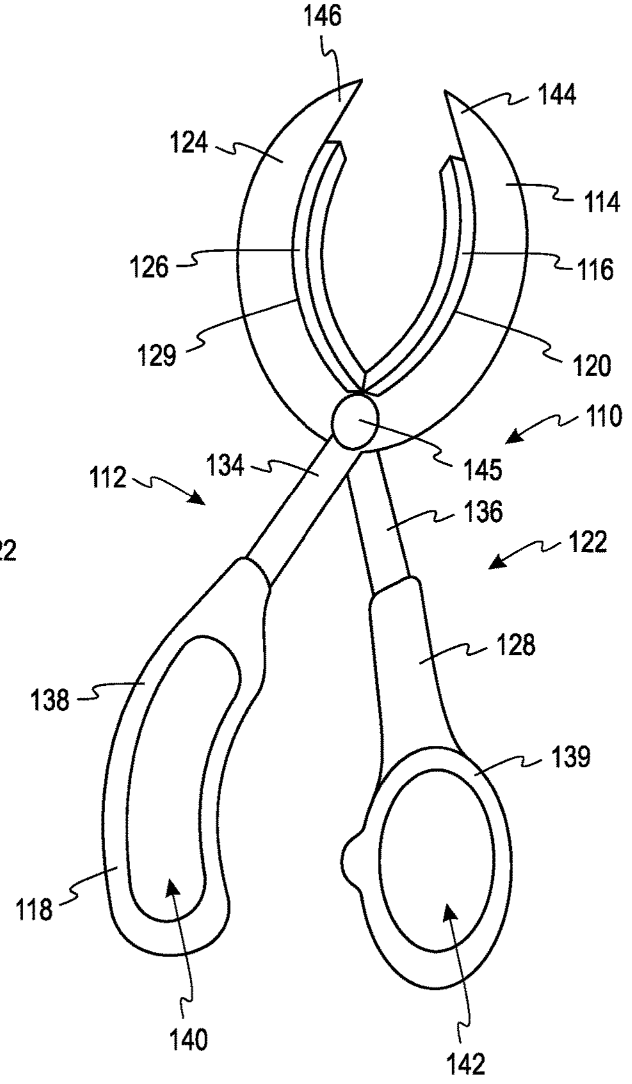
FIG. 5 is a top view of the hair-cutting apparatus of FIG. 4 in an open position.

Referring now to FIGS. 4-6B, a hair-cutting apparatus 110 according to another embodiment is shown. In FIGS. 4-6B, the reference numerals are listed as 100-series reference numerals for clarity. FIG. 4 shows the hair-cutting apparatus 110 in a closed position, while FIG. 5 shows the hair-cutting apparatus 110 in an open position. FIGS. 4-6B are similar to FIGS. 1-3B, but primarily differ by the orientation and geometry of the curved blades (i.e., 16, 116 and 26, 126).

As shown in FIGS. 4-5, the hair-cutting apparatus 110 includes a first scissor 112 that is pivotably connected to a second scissor 122. The first scissor 112 includes a first jaw 114 that has a first curved blade 116. In this embodiment, the first curved blade 116 protrudes generally perpendicularly from a concave inner surface 120 of the first jaw 114. The first scissor 112 further includes a first handle 118 that is connected to the first jaw 114.

The second scissor 122 includes a second jaw 124 with a concave inner surface 129. In this embodiment, a second curved blade 126 protrudes generally perpendicularly from the concave inner surface 129 of the second jaw 124. The second scissor 122 further includes a second handle 128 connected to the second jaw 124. As shown best in FIGS. 4-5, the first scissor 112 and the second scissor 122 are pivotably connected at a connection point 145 between their respective handles 118, 128 and jaws 114, 124 to facilitate the hair-cutting apparatus 110 in moving or pivoting between opened and closed positions.

As shown best in FIG. 4, the first curved blade 116 and the second curved blade 126 form an opening 130 when the hair-cutting apparatus 110 is in the closed position. The opening 130 is of a generally elongated ellipse shape and is configured to receive and correspond with braided hair. The opening 130 is configured such that only loose ends are cut by the hair-cutting apparatus 110, and not the braid itself.

Figure 6A:
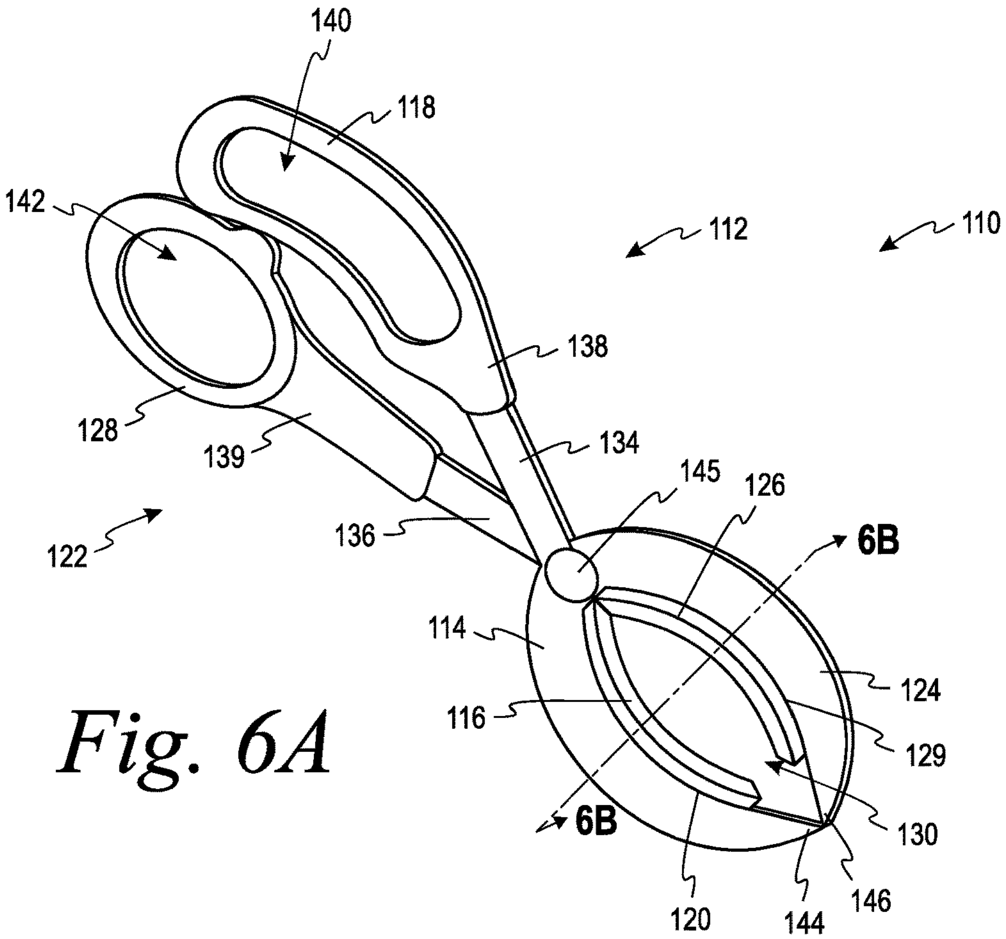
FIG. 6A is a perspective view of a hair-cutting apparatus according to another embodiment.

FIG. 6A shows a perspective view of the hair-cutting apparatus 110 of FIGS. 4-5 with a cross sectional line 6B-6B of FIG. 6A. The cross-sectional view of FIG. 6B is a view from the handles 118, 128 looking downwardly.

As shown best in FIG. 6A, the first jaw 114 and the second jaw 124 define a generally horizontal plane. In this embodiment, for example, the concave inner surface 120 of the first jaw 114 and the concave inner surface 129 of the second jaw 124 are facing each other. As shown best in FIG. 6B, the first curved blade 116 differs from the first curved blade 16 of FIG. 3B. Specifically, the first curved blade 116 of FIG. 6B has a generally horizontal portion 116*a* and a generally angled portion 116*b*. The first curved blade 116 initially projects generally parallel to the horizontal plane defined by the first and second jaws 114, 124 to form the generally horizontal portion 116*a*. The first curved blade 116 then bends downwardly and inwardly at a distance farther from the first jaw 114 to form the generally angled portion 116*b*. The generally angled portion 116*b* deviates from the generally horizontal plane at a first angle C. Similarly, the second curved blade 126 of FIG. 6B differs from the second curved blade 26 of FIG. 3B. The second curved blade 126 of FIG. 6B has a generally horizontal portion 126*a* and a generally angled portion 126*b*. The second curved blade 126 initially projects generally parallel to the horizontal plane defined by the first and second jaws 114, 124 to form the generally horizontal portion 126*a*. The first curved blade 126 then bends downwardly and inwardly at a distance farther from the second jaw 124 to form the generally angled portion 126*b*. The generally angled portion 126*b* deviates from the generally horizontal plane at a second angle D.

Figure 6B:
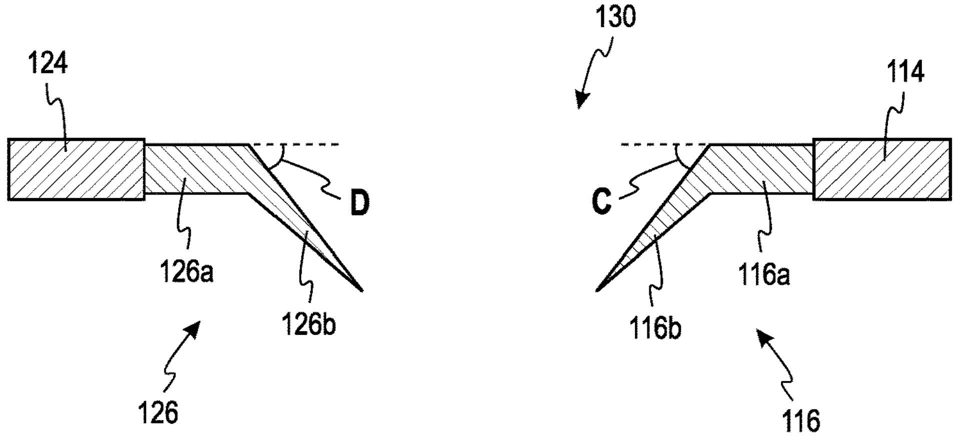
FIG. 6B is a cross sectional view of the hair-cutting apparatus along a line 6B-6B of FIG. 6A.

As shown best in FIG. 6B, the first angle C and the second angle D may be between about 10 degrees to about 80 degrees. In a further embodiment, the first angle C and the second angle D are from about 20 degrees to about 70 degrees. In another embodiment, the first angle C and the second angle D are from about 30 degrees to about 60 degrees. It is contemplated that the first angle C is about the same as the second angle D in one embodiment.

In one embodiment and as shown in FIGS. 4-6A, at least one of the first jaw 114 and the second jaw 124 is in a general shape of an arc. This general shape of an arc may form the concave inner surface 120 from which the first curved blade 116 protrudes from the first jaw 114. Similarly, the general shape of an arc may form the concave inner surface 129 from which the second curved blade 126 protrudes from the second jaw 124.

In one embodiment, the hair-cutting apparatus 110 further includes a first shank 134 and a second shank 136. As shown in FIGS. 4-6A, the first shank 134 connects the first handle 118 to the first jaw 114. Similarly, the second shank 136 connects the second handle 128 to the second jaw 124.

In one embodiment, the first handle 118 and the second handle 128 further include a respective rubber coating 138, 139. The rubber coating 138, 139 are the same as discussed above with respective rubber coatings 38, 39.

As shown in FIGS. 4-6A, the hair-cutting apparatus 110 further includes a first opening 140 formed and defined by the first handle 118, and a second opening 142 formed and defined by the second handle 128. The first opening 140 and the second opening 142 are desirably sized and shaped to allow one or more fingers of a user to extend therethrough. In one embodiment, the first opening 140 is larger than the second opening 142. In some embodiments, the first opening 140 is configured to enclose one, two, three, or four fingers of a user and the second opening 142 is configured to enclose a thumb of a user. In some embodiments, the first opening 140 is larger than the second opening 142.

In some embodiments, the hair-cutting apparatus 110 further includes a first jaw tip 144 of the first jaw 114, which is located on the first jaw 114 farther from the first handle 118, and a second jaw tip 146 of the second jaw 124, which is located on the second jaw 124 farther from the second handle 128. In one embodiment, and as shown best in FIG. 4, the first jaw tip 144 and the second jaw tip 146 are configured to contact each other when the hair-cutting apparatus 110 is in the closed position.

Figure 7:
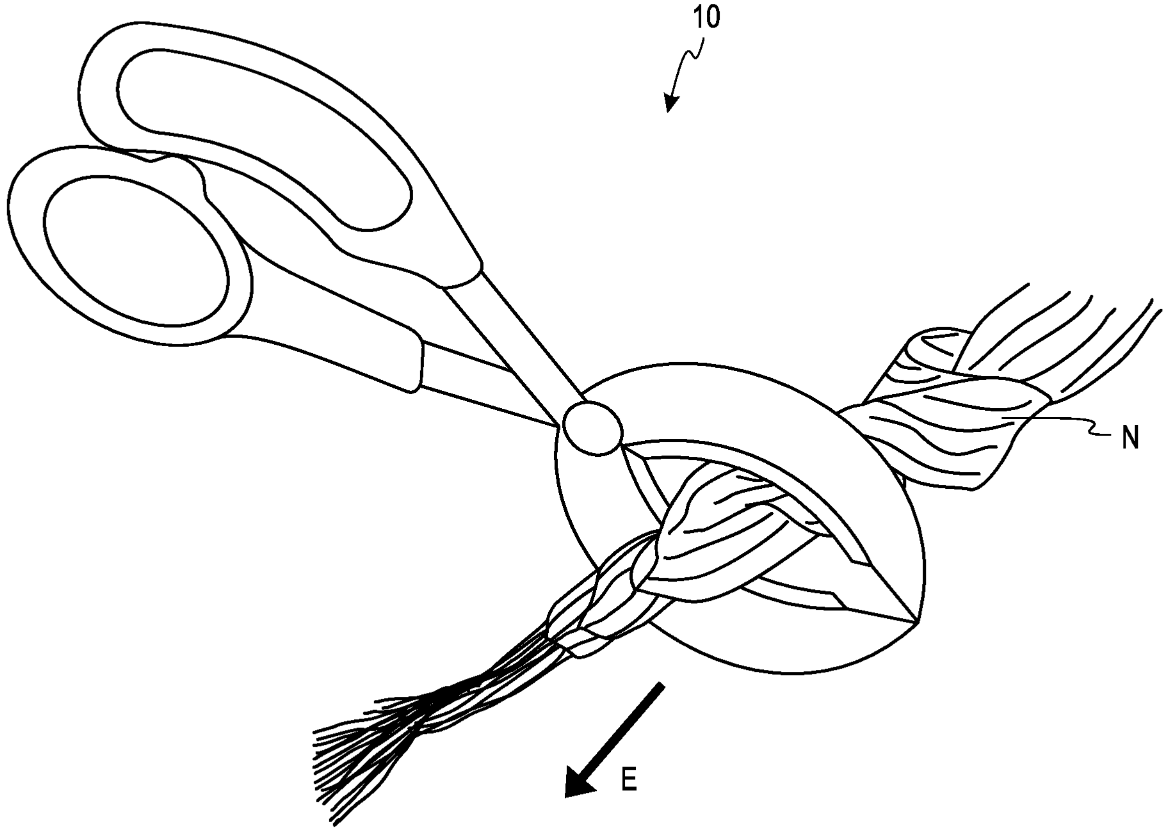
FIG. 7 shows a method of using the hair-cutting apparatus of FIGS. 1-3B for trimming hair fibers from braided hair according to one method.

The process of trimming hair fibers from braided hair may be performed by different methods. One non-limiting example of a method for trimming hair fibers from braided hair is depicted in FIG. 7. A method of trimming hair fibers from braided hair includes providing a hair-cutting apparatus. In FIG. 7, the hair cutting apparatus 10 of FIGS. 1-3B, is shown. It is contemplated that the hair-cutting apparatus used in the method may be one of the hair-cutting apparatus 10, 110 shown in FIGS. 1-6B and/or as variously described herein, or others. The method further includes providing braided hair N and positioning the hair-cutting apparatus around a length of the braided hair N as shown in FIG. 7. The length of braided hair N extends from a first end to a second end. Desirably, the first end of the length of braided hair N is near and/or at a scalp and the second end of the length of braided hair N is near and/or at ends of the braided hair N.

The method further includes moving the hair-cutting apparatus from the first end to the second end of the braided hair N as depicted by an arrow E indicative of motion. This movement E of the hair-cutting apparatus causes the first curved blade (e.g., first curved blade 16 or 116) and the second curved blade (e.g., second curved blade 26, 126) to contact and trim hair fibers that protrude from the braided hair N. This movement E is desirably a downwards movement, with the hair-cutting apparatus moving away from the scalp and towards the ends of the braided hair N.

In some embodiments, the method of trimming hair fibers includes trimming natural hair fibers, synthetic hair fibers, or a combination thereof. In one embodiment, the method further includes squeezing the first handle (e.g., first handle 18, 118) and the second handle (e.g., second handle 28, 128) closer together so that the hair-cutting apparatus is in the closed position after positioning the hair-cutting apparatus around the length of braided hair.

What is claimed is:

1. A hair-cutting apparatus including:

a first scissor including a first jaw, a first curved blade, and a first handle, the first jaw including a first tip and a first concave inner surface, the first tip located on the first jaw farther from the first handle, the first curved blade projecting from the first concave inner surface of the first jaw; and a second scissor including a second jaw, a second curved blade, and a second handle, the second jaw including a second tip and a second concave inner surface, the second tip located on the second jaw farther from the second handle, the second curved blade projecting from the second concave inner surface of the second jaw;

the first and second jaws pivotably connected to each other and configured to move between open and closed positions, the first tip of the first jaw and the second tip of the second jaw configured to contact each other in the closed position and be spaced apart from each other in the open position, the first curved blade and the second curved blade forming an opening in the closed position, the opening being of a generally elongated ellipse shape and configured to receive braided hair;

wherein the first and second jaws define a plane along which the first and second jaws are configured to move between the open and closed positions, the first curved blade projecting in a first direction at a first angle generally away from the plane and towards the second curved blade, the second curved blade projecting in a second direction at a second angle generally away from the plane and towards the first curved blade, the first and second angles are from about 10 degrees and to about 80 degrees.

2. The hair-cutting apparatus of claim 1, wherein the first angle and the second angle are from about 20 degrees to about 70 degrees.

3. The hair-cutting apparatus of claim 2, wherein the first and the second angle are from about 30 degrees to about 60 degrees.

4. The hair-cutting apparatus of claim 1, wherein the first jaw and the second jaw are in a general shape of an arc.

5. The hair-cutting apparatus of claim 1, wherein the first scissor further includes a first shank, the first shank connecting the first handle and the first jaw, and the second scissor further includes a second shank, the second shank connecting the second handle and the second jaw.

6. The hair-cutting apparatus of claim 1, wherein the first handle and the second handle further include a rubber coating.

7. The hair-cutting apparatus of claim 1, wherein the first handle forms a first opening therein, and the second handle forms a second opening therein, the respective first and second openings of the respective first and second handles configured to enclose one or more fingers of a user.

8. The hair-cutting apparatus of claim 7, wherein the first opening of the first handle is larger than the second opening of the second handle.

* * * * *